Patented May 31, 1949

2,471,464

UNITED STATES PATENT OFFICE 2,471,464

METHOD OF PREPARING PARA NITROPHENYL DIETHYL THIONOPHOSPHATE

Arthur Dock Fon Toy, Chicago, and Thomas M. Beck, Homewood, Ill., assignors to Victor Chemical Works, a corporation of Illinois No Drawing. Application December 22, 1947, Serial No. 793,310

8 Claims. (Cl. 260—461)

This invention relates to an improved method for preparing para nitrophenyl diethyl thionophosphate by reacting diethyl thiono chlorophosphate with sodium para nitrophenolate in the presence of a catalyst, and relates particularly to such a method wherein an aliphatic amine is used as the catalyst.

The preparation of para nitrophenyl diethyl thionophosphate by heating diethyl thiono chlorophosphate with sodium para nitrophenolate at 130° C. using chlorobenzene as a reaction medium is known but the yields of the ester product are unsatisfactory within commercial periods of time. Efforts to speed up the reaction by increasing the temperature were not successful, as the product was found to be highly contaminated with acidic side reaction products.

We have discovered that the reaction may be greatly speeded up and that high yields may be obtained within commercial periods of time by carrying out the reaction in the presence of an aliphatic amine catalyst. As little as 0.25% of the catalyst, based on the total weight of the reactants will cause the reaction to proceed at a rapid but controllable rate at temperatures as low as 100° C. Nearly quantitative yields of esters are obtained which have only slight amounts of acidic or potentially acidic impurities.

The preferred amine catalysts for the reaction are the aliphatic tertiary amines, such as triethyl amine, tributyl amine, n-ethyl morpholine, hexamethylene tetraamine, and the like. Aliphatic secondary amines and aliphatic-aryl amines may also be employed as catalysts but they are not as effective as the aliphatic tertiary amines.

The reaction is preferably carried out in a solvent for at least one of the reactants which acts as a reaction medium.

The following examples illustrate the improved process:

Example I 62.5 grams of substantially anhydrous sodium para nitrophenolate was added to 100 grams of chlorobenzene and 68.5 grams of diethyl thiono chlorophosphate. 0.6 gram of triethyl amine was added to the mixture. The mixture was stirred at 100° to 110° C. for two hours, then cooled to room temperature and washed with water to remove the sodium chloride formed in the reaction and any excess sodium para nitrophenolate 91%. Analysis of the product showed it to be a substantially pure compound containing 11.3% P, 10.5% S, and 0.1% Cl compared to the theoretical values of 10.65% P, 11.0% S and 0.0% Cl for the pure product. The slight amount of impurities in the product were of acidic nature. One gram of the product when stirred in a large excess of water required only 0.4 cc. of N/10 caustic soda to neutralize the acidity. No change in acidity developed after stirring in water for 48 hours.

The product had a very high toxicity to white mice, and insects, and the principal use of the product is for insect and rodent pest control.

Example II

The same amounts of solvent and reactants were used as in Example I, except that the triethyl amine was replaced with 1.1 grams of tributyl amine. The mixture was heated two hours at 115° C., and the ester product separated as in Example I. A yield of 92% was obtained of ester product having the same characteristics as the product of Example I.

Example III

The same amounts of solvent and reactants were used as in Example I, except that 0.9 gram of N-ethyl morpholine was used as the catalyst. After heating the mixture at 110° C. for two hours, the product was then separated as in Example I. An 88% yield of the substantially pure product was obtained.

Example IV

Example I was again repeated except that 1.5 grams of hexamethylene tetramine was employed as the catalyst and the mixture heated at 130° C. for 2½ hours. A 93% yield of the ester product was obtained.

The improvement in the process resulting from the introduction of an aliphatic amine catalyst is readily apparent by comparison of the 88 to 93% yields in the above examples in 2 to 2½ hours with the less than 50% yield in ten hours when employing the prior art process.

The mechanism of the catalytic reaction is not understood but it is believed that the aliphatic amine first forms a co-ordination compound with the diethyl thiono chlorophosphate thus making the chlorine atom more active towards the sodium atom of the sodium para nitrophenolate, and that when the nitrophenolate radical comlimited to these theoretical considerations. Based on this theory only a trace of the amine catalyst should be necessary. However, it has been found that the amount of catalyst should be at least 0.25% by weight of the total reactants in order to increase the reaction rate so that the reaction may be carried out in a commercially feasible period of time. The amount of catalyst may be increased from 0.25% to 2.00% or even more without substantially changing the reaction characteristics.

The temperature employed is preferably maintained within the range from 100-130° C. though a higher temperature may be employed so long as it is held below the decomposition point of the reactants or ester product, which is above 150° C.

Chlorobenzene has been used in the above examples as a reaction medium, but other inert solvents such as xylene, chlorotoluene, and the like may be employed. The reaction may also be carried out without use of a solvent medium, but such method is not preferred because of the difficulty of obtaining proper mixing of the reactants.

Having described our invention in considerable detail, it is our intention that the invention be not limited by any of the details of description unless otherwise stated, but rather be construed broadly within its spirit and scope as set out in the accompanying claims.

We claim:

1. The method of preparing para nitrophenyl diethyl thionophosphate which comprises reacting diethyl thiono chlorophosphate with substantially anhydrous sodium para nitrophenolate in the presence of an aliphatic tertiary amine catalyst.

2. The method of claim 1 wherein the reaction is carried out in the presence of a solvent for at least one of the reactants.

3. The method of claim 1 wherein the reaction is carried out at a temperature from about 100° to 130° C.

4. The method of claim 1 wherein the catalyst is present in an amount that is at least about 0.25% by weight of the reactants.

5. The method of preparing para nitrophenyl diethyl thionophosphate which comprises reacting diethyl thiono chlorophosphate with substantially anhydrous sodium para nitrophenolate in a chlorobenzene reaction medium at a temperature between about 100° and 130° C. in the presence of at least 0.25% by weight of the reactants of an aliphatic tertiary amine catalyst.

6. The method of claim 5 wherein the catalyst is triethyl amine.

7. The method of claim 5 wherein the catalyst is hexamethylene tetramine.

8. The method of claim 5 wherein the catalyst is tributyl amine.

ARTHUR DOCK FON TOY.
THOMAS M. BECK.

REFERENCES CITED

The following references are of record in the file of this patent:

Field Information Agency Technical Report No. 949, "Organic Chemical Intermediates for Insecticides, Fungicides and Rodenticides," Office of Publications Board, Department of Commerce, Publication PB60,890, released May 30, 1947, pages 19 and 20.